United States Patent [19]

Nakagawa et al.

[11] 4,150,890

[45] Apr. 24, 1979

[54] DEVICE IN CAMERA SHUTTER FOR MAINTAINING SEPARATE BLADES IN INTIMATE CONTACT WITH EACH OTHER

[75] Inventors: Tadashi Nakagawa; Mitsuo Koyama; Eiichi Onda, all of Yotsukaido, Japan

[73] Assignee: Seiko Koki Kabushiki Kaisha, Japan

[21] Appl. No.: 688,312

[22] Filed: May 20, 1976

[30] Foreign Application Priority Data

May 22, 1975 [JP] Japan .............................. 50-69651[U]

[51] Int. Cl.² ................................................ G03B 9/40
[52] U.S. Cl. ..................................... 354/246; 354/248
[58] Field of Search ............... 354/246, 247, 248, 249, 354/261

[56] References Cited

FOREIGN PATENT DOCUMENTS 2341750 2/1974 Fed. Rep. of Germany ........... 354/249

Primary Examiner—Michael L. Gellner
Attorney, Agent, or Firm—Robert E. Burns; Emmanuel J. Lobato; Bruce L. Adams

[57] ABSTRACT

A plurality of separate shutter blades are arranged in a plane defined between a pair of base plates each having a shutter exposure aperture. Projections are provided on the base plates for urging the respective blades to be held in intimate contact with each other when the blades are in a position where they cover the aperture.

1 Claim, 4 Drawing Figures

DEVICE IN CAMERA SHUTTER FOR MAINTAINING SEPARATE BLADES IN INTIMATE CONTACT WITH EACH OTHER

BACKGROUND OF THE INVENTION

This invention relates to a device in a camera shutter for maintaining shutter separate blades in intimate contact with each other.

It is highly desirable to provide a plurality of shutter separate blades for covering a shutter aperture for the purpose of reducing the size of the shutter. However, the separate blades are constructed generally of thin metal plates and can not satisfactorily maintain themselves in intimate contact with each other and such blades require high precision machining in order to provide the necessary high degree of lightproof characteristics needed for the shutter. This invention makes it possible to manufacture a shutter with ease and without high precision machining and which shutter is simple in construction and has a high degree of lightproof characteristics achieved by maintaining the blades in intimate contact with each other.

A difficulty attendant with conventional shutters of this type is that sufficient flatness of the surfaces of each shutter separate blade constructed of a thin plate can not be achieved while the blade is being manufactured whereby a small clearance is formed between adjacent blades. The clearance prevents the blades from being held in intimate contact with each other thereby rendering the lightproof characteristics poor and insufficient. This has led to the drawback that providing the sufficient flatness of the blade surfaces requires skillful high precision machining which in turn makes it difficult to produce less costly shutters.

With the construction according to the invention, the blades can be maintained in intimate contact with one another even if there are employed separate blades having surfaces of insufficient flatness. This is accomplished by providing at set of projections for urging the respective blades together when in their open and closed positions.

According to the invention, the respective blades are held in intimate contact with each other by using an extremely simple structure. Accordingly, conventional high precision machining is no longer necessary to produce blades having a tendency to maintain themselves in close contact with each other nor to impart sufficient flatness to the surfaces of respective blades. The prior art type blades with such a tendency are held in frictional engagement with one another and the frictional forces between the blades prevent their smooth movement. The present invention eliminates the above prior art shortcoming.

BRIEF DESCRIPTION OF THE INVENTION

DETAILED DESCRIPTION OF PREFERRED EMBODIMENTS

Figure 1:
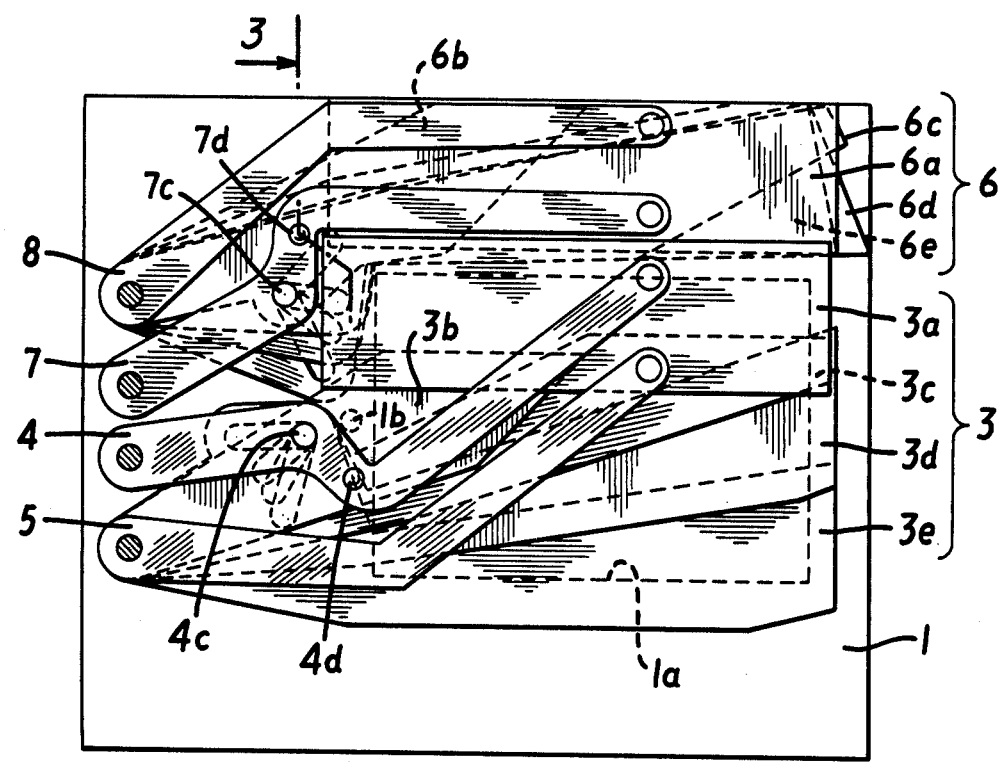
FIG. 1 is a plan view of a first embodiment of this invention.

In FIG. 1, a shutter base plate (1) has an exposure aperture (1a) defined therein. A subsidiary plate (2) substantially identical in shape with the base plate (1) is supported over the base plate (1) (See FIG. 3). Between these base plates, there are provided an opening group of shutter blades (3) for starting or initiating an exposure operation and a closing group of shutter blades (6) for finishing or completing the exposure, these groups each being supported on one end of the base plate (1) and being movable between a first closed position where they cover or close the aperture and a second open position where they uncover or open the aperture.

Each of the groups of shutter blades (3), (6) is composed of a plurality of separate, small size blades. The structure and mode of operation of the separate blades are fully disclosed in Utility Model No. 49-63948 laid open to public inspection and therefore, their explanation is omitted herein.

Figure 2:
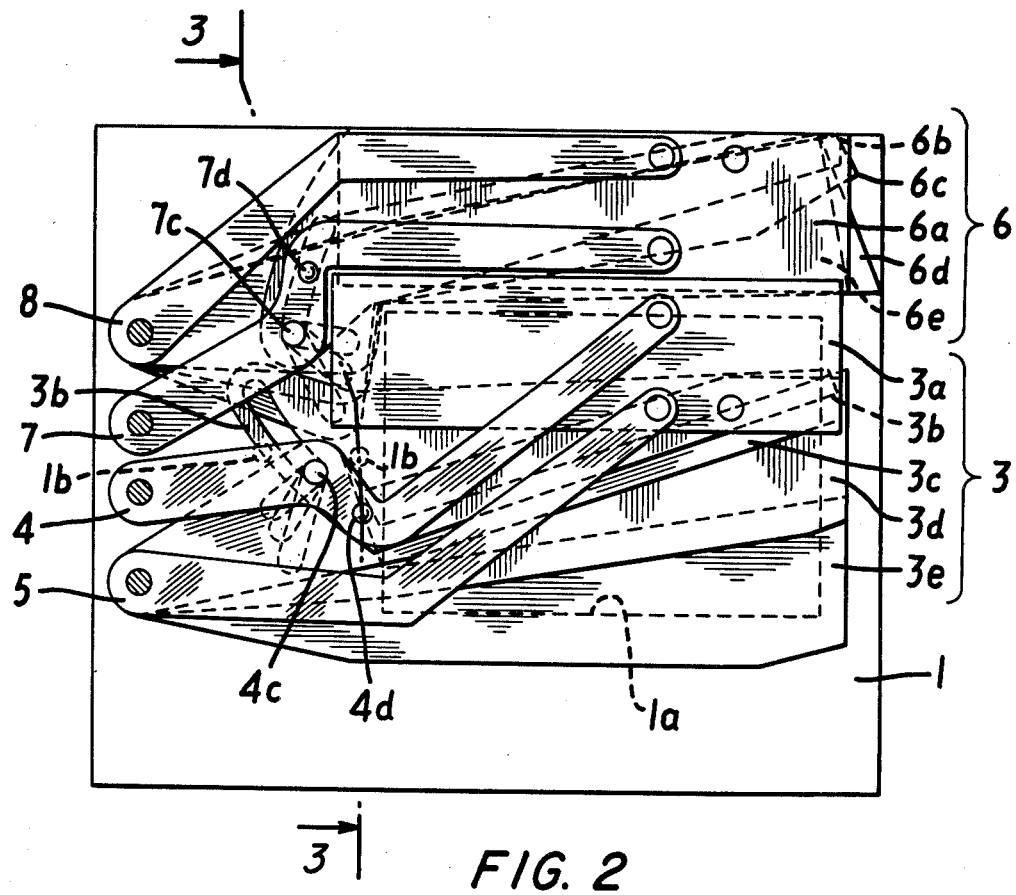
FIG. 2 is a plan view of a second embodiment of this invention.

FIG. 2 shows another arrangement of the separate blades which is similar in structure to that shown in FIG. 1. The mode of operation of the FIG. 2 arrangement is similar to that of the blade groups disclosed in Utility Model No. 48-111133 laid open to public inspection and therefore, its explanation is omitted herein.

Figure 3:
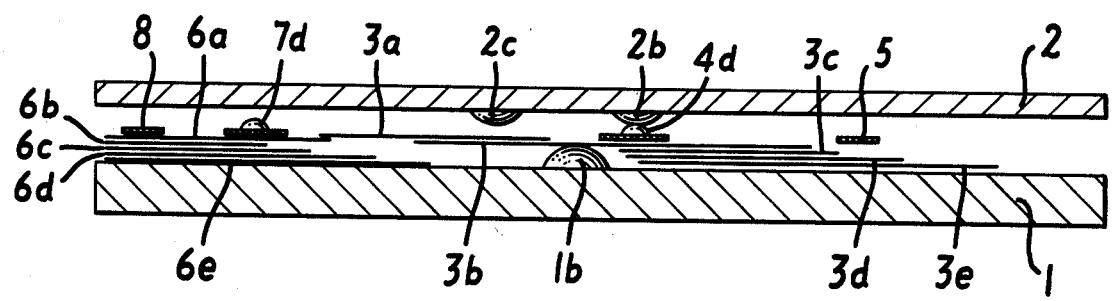
FIG. 3 is a cross-sectional view taken along lines III—III of FIGS. 1 and 2.

FIG. 3 is a cross-sectional view taken along line lines III—III of FIGS. 1 and 2. As shown, the base plate (2) has formed thereon downwardly projecting projections (2b), ('c) which are engageable with an upwardly projecting projection (4d) on an opening member (4) and an upwardly projecting projection (7d) on a closing member (7), respectively, when these projections (4d), (7d) come to the first position where the blades cover or close the shutter aperture (1a) whereupon the projections (2b), (2c) bias the opening group of shutter blades (3) and the closing group of shutter blades (6) toward the base plate (1). The base plate (1) has an upwardly projecting projection (1b) formed thereon which is positioned so as to be engageable with a separate covering blade (3b) of the opening group of shutter blades (3) or a separate covering blade (6b) of the closing group of shutter blades (6), whereupon blade (3b) or (6b), when held in the aperture covering position, is urged into contact with blade (3a) or (6a) adjacent to and upwardly of the blade (3b) or (6b).

Figure 4:
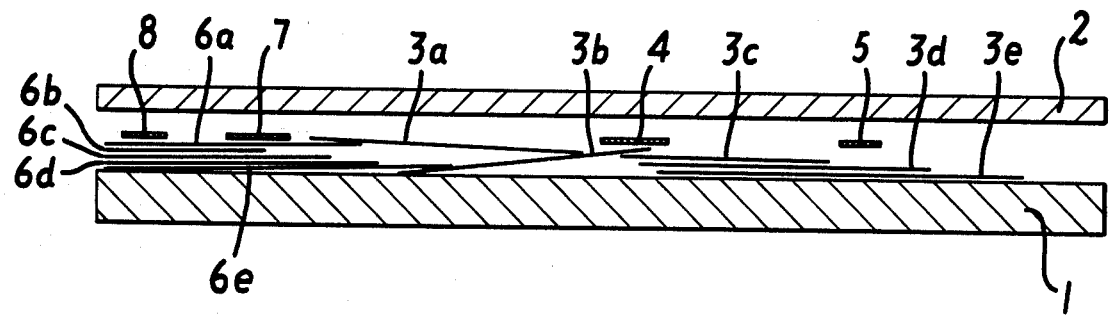
FIG. 4 is a view similar to FIG. 3 but showing a conventional prior art type device.

FIG. 4 illustrates the conventional type base plates and shutter blades in the position corresponding to that shown in FIG. 3. In FIG. 4, since there are no downwardly projecting projections on the subsidiary plate (2), the groups of shutter blades are movable relatively freely. Further, with no upwardly projecting projection (1b), the separate covering blade (3b) slides beneath the closing group of shutter blades (6) when the shutter is set thereby forming clearances or gaps in the group of shutter blades (3) which in turn have reduced lightproof characteristics.

Thus, it will be understood that the maximum lightproof characteristics can be obtained when adjacent shutter blades are held in planes parallel and close to each other.

While the above embodiments have been described with respect to the focal-plane shutter, the invention is also applicable to the lens shutter having one or two sets of blades in which case the base plates have formed thereon projections projecting in a direction to hold the blades in close contact with one another only when the aperture is closed. Furthermore, it is possible to provide projections corresponding to succeeding respective blades. Still further, the respective blades can have projections which operate in the same way as in the disclosed embodiments. What is claimed is:

1. A camera shutter mechanism comprising: two spaced apart plates having means therein defining a shutter aperture; at least one group of blades disposed between said plates and movable in a predetermined plane between a first position in which the blades cover the shutter aperture and a second position in which the blades uncover the shutter aperture; and means including one projection on at least one of said plates and another projection on the other of said plates coacting with said one projection for urging the blades of said group into intimate contact with each other in a direction normal to said plane when the blades are in said first position so as to maintain the blades of said group in a plane parallel to said predetermined plane when the blades are in said first position.

* * * * *